US010899261B2

(12) United States Patent
Subat et al.

(10) Patent No.: US 10,899,261 B2
(45) Date of Patent: *Jan. 26, 2021

(54) ACOUSTIC OUTPUT THROUGH HEADREST WINGS

(71) Applicant: Bose Corporation, Framingham, MA (US)

(72) Inventors: Bradford Kyle Subat, Worcester, MA (US); Charles Oswald, Salem, NY (US); Joseph Walter McCabe, Rochester Hills, MI (US)

(73) Assignee: Bose Corporation, Framingham, MA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/295,221

(22) Filed: Mar. 7, 2019

(65) Prior Publication Data

US 2019/0202330 A1 Jul. 4, 2019

Related U.S. Application Data

(63) Continuation of application No. 15/072,925, filed on Mar. 17, 2016, now Pat. No. 10,239,432.

(51) Int. Cl.
*B60N 2/879* (2018.01)
*B60R 11/02* (2006.01)
(Continued)

(52) U.S. Cl.
CPC .......... *B60N 2/879* (2018.02); *B60N 2/0244* (2013.01); *B60N 2/806* (2018.02); *B60N 2/812* (2018.02);
(Continued)

(58) Field of Classification Search
CPC ........ B60N 2/879; B60N 2/812; B60N 2/885; B60N 2/806; B60N 2/0244; B60N 2/891;
(Continued)

(56) References Cited

U.S. PATENT DOCUMENTS

| 4,042,791 A | 8/1977 | Wiseman |
| 4,638,884 A | 1/1987 | Lee |

(Continued)

FOREIGN PATENT DOCUMENTS

| CN | 1042036 | 5/1990 |
| CN | 201472197 | 5/2010 |

(Continued)

OTHER PUBLICATIONS

Chinese Office Action in CN Appln. No. 201780025066.8, dated Jul. 31, 2020, 16 pages (with English translation).

*Primary Examiner* — Donald J Wallace
(74) *Attorney, Agent, or Firm* — Fish & Richardson P.C.

(57) ABSTRACT

The technology described in this document can be embodied in a headrest of a seat, the headrest including an enclosure for housing one or more acoustic transducers, and an adjustable headrest wing disposed in front of the enclosure. The headrest wing is coupled to the enclosure by a pivot, and configured to be adjusted to one of multiple positions within an angle range around the pivot. The headrest wing is also configured to support the head of a seat-occupant. The headrest further includes a connector disposed between the enclosure and a rear portion of the headrest wing. The connector is configured to provide an acoustic channel between the enclosure and the headrest wing such that audio signals from the one or more acoustic transducers are radiated outward through the headrest wing.

20 Claims, 7 Drawing Sheets

(51) Int. Cl.
*H04R 5/02* (2006.01)
*B60N 2/885* (2018.01)
*B60N 2/812* (2018.01)
*B60N 2/806* (2018.01)
*B60N 2/02* (2006.01)
*B60R 11/00* (2006.01)
*B60N 2/891* (2018.01)

(52) U.S. Cl.
CPC .......... *B60N 2/885* (2018.02); *B60R 11/0217* (2013.01); *H04R 5/023* (2013.01); *B60N 2/891* (2018.02); *B60N 2002/0272* (2013.01); *B60R 2011/0017* (2013.01); *H04R 2201/025* (2013.01); *H04R 2499/13* (2013.01)

(58) Field of Classification Search
CPC ........ B60N 2002/0272; B60R 11/0217; B60R 2011/0017; H04R 5/023; H04R 2201/025; H04R 2499/13
See application file for complete search history.

(56) References Cited

U.S. PATENT DOCUMENTS

| | | |
|---|---|---|
| 4,696,370 A | 9/1987 | Tokumo |
| 4,797,934 A | 1/1989 | Hufnagel |
| 5,313,678 A | 5/1994 | Redewill |
| 5,370,446 A | 12/1994 | Bancod |
| 5,687,246 A | 11/1997 | Lancon |
| 5,887,071 A | 3/1999 | House |
| 5,997,091 A | 12/1999 | Rech et al. |
| 6,234,446 B1 | 5/2001 | Patterson |
| 6,744,898 B1 | 6/2004 | Hirano |
| 6,991,289 B2 | 1/2006 | House |
| 9,769,581 B1 | 9/2017 | Oswald |
| 2001/0040975 A1 | 11/2001 | Klein |
| 2002/0018576 A1 | 2/2002 | Shima |
| 2003/0142842 A1 | 7/2003 | Arai |
| 2003/0152245 A1 | 8/2003 | Maekawa et al. |
| 2005/0179300 A1 | 8/2005 | O'Connor |
| 2013/0279716 A1 | 10/2013 | Hartung et al. |
| 2014/0183321 A1 | 7/2014 | Tsai |
| 2014/0270322 A1 | 9/2014 | Silverstein |
| 2014/0355783 A1 | 12/2014 | Subat |
| 2015/0201260 A1 | 7/2015 | Oswald et al. |
| 2016/0023763 A1 | 1/2016 | Tracy |
| 2016/0100250 A1 | 4/2016 | Baskin |

FOREIGN PATENT DOCUMENTS

| | | | |
|---|---|---|---|
| CN | 109070782 | 12/2018 | |
| EP | 1 083 094 | 8/2000 | |
| EP | 2975863 A1 * | 1/2016 | ........... G10K 11/178 |
| JP | 03-85095 | 4/1991 | |
| JP | 03-85096 | 4/1991 | |
| JP | 05-137630 | 6/1993 | |
| JP | 07-288885 | 10/1995 | |
| JP | 2000-270390 | 9/2000 | |
| JP | 2002-191469 | 7/2002 | |
| JP | 2005-27019 | 1/2005 | |
| JP | 2009291454 | 12/2009 | |
| JP | 2010042209 | 2/2010 | |

* cited by examiner

ACOUSTIC OUTPUT THROUGH HEADREST WINGS

TECHNICAL FIELD

This disclosure generally relates to seats that include acoustic output devices such as speakers.

BACKGROUND

Headrests used in vehicle seats can include speakers to deliver a near-field acoustic experience.

SUMMARY

In one aspect, this document features a headrest of a seat, the headrest including an enclosure for housing one or more acoustic transducers, and an adjustable headrest wing disposed in front of the enclosure. The headrest wing is coupled to the enclosure by a pivot, and configured to be adjusted to one of multiple positions within an angle range around the pivot. The headrest wing is also configured to support the head of a seat-occupant. The headrest further includes a connector disposed between the enclosure and a rear portion of the headrest wing. The connector is configured to provide an acoustic channel between the enclosure and the headrest wing such that audio signals from the one or more acoustic transducers are radiated outward through the headrest wing.

In another aspect, this document features a seat headrest that includes a housing and an adjustable headrest wing. The housing provides structural support to the seat headrest, and includes a recessed portion. The adjustable headrest wing is disposed at least in part within the recessed portion, and includes one or more acoustic transducers. The headrest wing also includes a surface for supporting at least a portion of the head of an occupant, and a perforated external layer covering at least a portion of the surface, wherein the perforated external layer is configured to pass acoustic signals generated by the one or more transducers. The headrest wing further includes at least one acoustic channel disposed between the one or more acoustic transducers and the perforated external layer, and a pivot for coupling the headrest wing to the housing such that the headrest wing is adjustable to one of multiple positions within an angle range around the pivot.

In another aspect, this document features a headrest of a seat, the headrest including an enclosure for housing one or more acoustic transducers, and an adjustable headrest wing disposed in contact with the enclosure. The headrest wing is configured to be adjusted to one of multiple positions within an angle range around the pivot. The headrest also includes an acoustic channel disposed between the one or more acoustic transducers and a front surface of the headrest wing, the acoustic channel configured to permit audio signals from the one or more acoustic transducers to be radiated outward through the front surface of the headrest wing.

Implementations of the above aspects can include one or more of the following features.

The connector includes a collapsible structure forming the acoustic channel. The headrest can include a sensor that detects a position of the adjustable headrest wing. At least one parameter of an output of the one or more acoustic transducers can be made adjustable based on the position of the adjustable headrest wing. The at least one parameter can include a gain and an equalization parameter. The angle range can be substantially 0-45°. The headrest wing can be manually adjustable, or adjustable to one of the multiple positions based on a control signal. A perforated external layer can cover at least a portion of a front surface of the adjustable headrest wing, the perforated external layer configured to pass acoustic signals generated by the one or more transducers. At least a portion of the acoustic channel can be disposed in the headrest wing. The acoustic channel can include a connector disposed between the enclosure and a rear portion of the headrest wing.

In another aspect, this document features a method for controlling acoustic output radiating through an adjustable wing of a seat headrest. The method includes receiving, from a sensor disposed in the seat headrest, an input signal indicative of a position of the adjustable wing. The position can be one of multiple positions within an angle range. The method also includes updating, based on the input signal, values for one or more control parameters associated with a transducer that generates the acoustic output radiating through the adjustable wing, and adjusting the transducer in accordance with the position of the adjustable wing using one or more control signals that are generated based on the updated values of the one or more control parameters.

In another aspect, this document features a system that includes a sensor and one or more processing devices. The sensor is disposed in communication with an adjustable wing of a seat headrest, and is configured to detect a position of an adjustable wing of a seat headrest, and generate a first signal indicative of the position of an adjustable wing of a seat headrest. The position can be one of multiple positions within an angle range. The one or more processing devices are configured to receive the first signal, and update, based on the first signal, values for one or more control parameters associated with a transducer that generates an acoustic output radiating through the adjustable wing. The one or more processing devices are also configured to generate, based on the updated values, one or more control signals for adjusting the transducer in accordance with the position of the adjustable wing using.

In another aspect, this document features one or more machine-readable storage devices having encoded thereon computer readable instructions for causing one or more processors to perform various operations. The operations include receiving an input signal indicative of a position of an adjustable wing of a seat headrest, wherein the position of the adjustable wing is detected by a sensor disposed in the seat headrest. The position can be one of multiple positions within an angle range. The operations also include updating, based on the input signal, values for one or more control parameters associated with a transducer that generates an acoustic output radiating through the adjustable wing, and adjusting the transducer in accordance with the position of the adjustable wing using one or more control signals generated based on the updated values of the one or more control parameters.

Implementations of the above aspects can include one or more of the following features.

The control parameters can include a gain, and/or one or more equalization parameters that depend on a spectral response of an acoustic channel formed for the particular position of the adjustable wing. The acoustic channel can include an acoustic connector disposed between the transducer and the adjustable wing of a seat headrest. The values of the one or more control parameters can be determined in accordance with a target acoustic distribution. The target acoustic distribution can be determined as a ratio of i) energy of the acoustic output radiating through the wing, and ii) energy of acoustic output radiating from at least one other acoustic transducer external to the seat headrest. The seat headrest can be a part of a seat in a vehicle, and the at least one other acoustic transducer can include one or more speakers disposed within the vehicle. The angle range can be substantially 0-45°.

Various implementations described herein may provide one or more of the following advantages. Speakers disposed within headrest wings may provide short and acoustically directional paths to the ears of an occupant. In some cases, this may improve the near-field acoustics for vehicle audio systems. By providing speakers within headrest wings, the wings may be configured to serve a dual purpose of supporting an occupant's head and providing quality acoustic experience. A high degree of control over the acoustic experience within a vehicle can be achieved by mixing the near-field audio from the headrest with the audio emanating from peripheral speakers disposed elsewhere in the vehicle. For example, adjusting gain and other equalization parameters based on a position of the headrest wings may allow for an acoustic experience to remain unchanged for an occupant when the position of the headrest wings are altered.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Vehicle seats (e.g., seats used in cars, trucks, buses, trains, aircrafts, boats, or other vehicles) can be fitted with acoustic transducers or speakers for delivering a near-field acoustic experience. In some cases, speakers are fitted into seats such that the speakers are proximate to the ears of an occupant of the seat, to provide an immersive, and potentially personalized acoustic experience. Headrests of vehicle seats often include adjustable, substantially lateral projections on one or both sides. These projections, also referred to as wings, can be adjusted (e.g., manually, or via electronic control signals) to different positions, for example, to support the head of an occupant in a comfortable position. The technology described in this document allows for acoustic output to be provided through such wings. In some cases, providing near-field audio through the wings in such a way may provide an immersive and high quality acoustic experience for an occupant of the seat. In some implementations, the acoustic output through the wings may be adjusted based on the position of the wings to provide an occupant with a substantially uniform acoustic experience for different positions of the wings. For example, if the occupant moves the wings closer to the ears, one or more signal processing parameters (e.g., gain) associated with the acoustic output can be adjusted such that moving the wings closer do not result in perception of a louder (and/or different) acoustic output. In some implementations, the near-field acoustic output through the wings can be adjusted/mixed in accordance with acoustic outputs radiated from other speakers (which may be collectively referred to as peripheral speakers) disposed in other parts of the vehicle (e.g., doors, under the seats, and dashboard). Therefore, in some cases, the technology may improve vehicular acoustics by providing high quality audio, which may be generated and delivered with a high degree of control. This document primarily uses examples of vehicle seat headrests to illustrate the technology. However, the technology may be applicable to other types of acoustically enabled seats or furniture that may have speakers installed in the manner described herein. For example, the technology can be used in massage chairs, sofas, recliners, tables, or beds fitted with speakers.

Figure 1A:
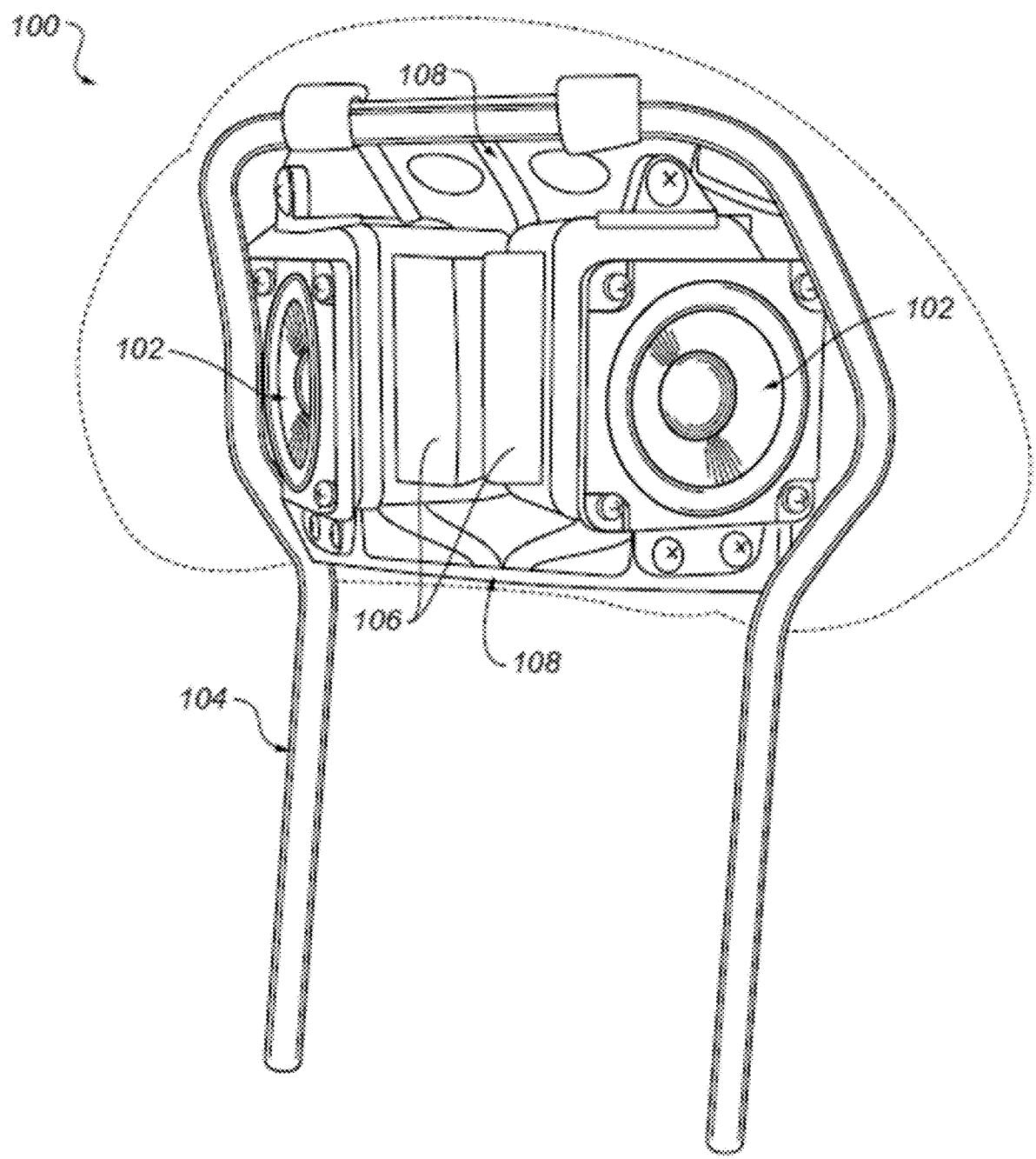
FIG. 1A is a perspective view of a headrest that includes speakers.

FIG. 1 illustrates an example of a headrest 100 that incorporates speakers 102. Referring to FIG. 1, the speakers 102 are attached to a U-shaped support rod 104 and are positioned such that the speakers 102 are directly behind the user's head (i.e., as opposed to the being located on the left and right sides of the U-shaped support rod or bar 104, which in some cases, may be replaced by a combination of two separate bars) and to fire outwardly, in diverging directions on either side of the headrest 100.

In some cases, a small plastic enclosure 106 is attached to each speaker 102 for forming an acoustic enclosure. In some implementations, each of those sub-assemblies are disposed in a housing (e.g., a sheet metal cage 108) which is secured to the U-shaped support rod 104. FIG. 1 shows a partial assembly with a front portion of the sheet metal cage 108 removed to view the speakers 102 and enclosures 106. A molded piece of foam cushioning may be placed around that assembly, which is subsequently covered with a cover material (e.g., fabric or leather).

Figure 1B:
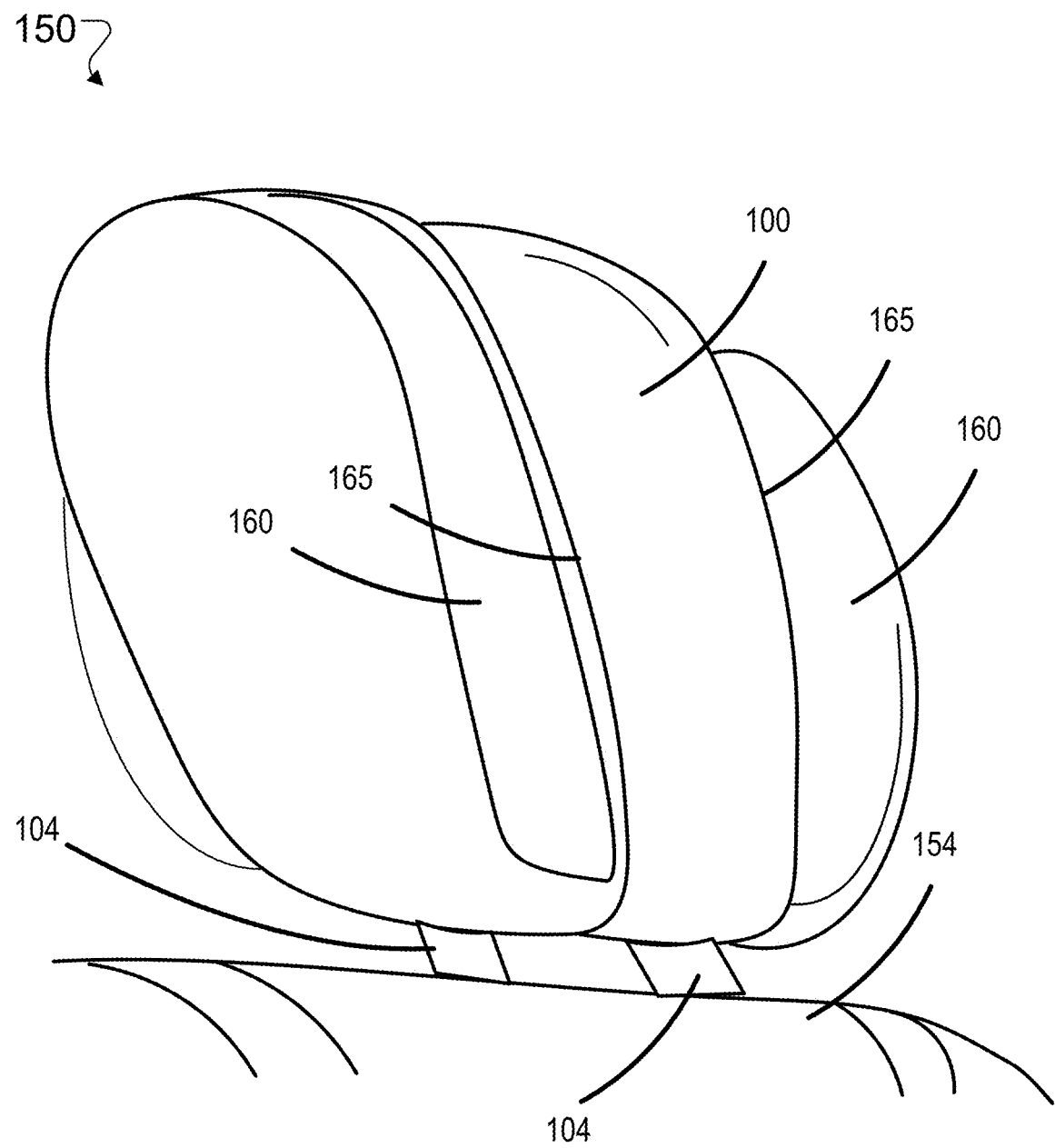
FIG. 1B is a perspective view of a headrest with wings.

The support rod 104 (which may also be referred to as a bar) can be used for mounting the headrest on a backseat of a vehicle seat. This is illustrated in FIG. 1B, which shows a vehicle seat 150 that includes a backrest 154. A headrest (e.g., the headrest 100 shown in FIG. 1A) may be mounted on the backrest 154. While FIG. 1B shows two support rods 104, the number of support rods may be different in other implementations. For example, a headrest 100 may be mounted on a backrest 154 using a single support rod 104. In another example, a headrest 100 may be mounted on a backrest 154 using three or more support rods 104. The headrest 100 may be mounted on the backrest 154 such that the headrest is movable with respect to the backrest to different positions over an adjustable range. For example, depending on the length of the one or more support rods 104, the headrest 100 may be moved up and down to different heights in order to support the head of an occupant. Once adjusted to a suitable height for an occupant, the headrest 100 may be fixed, for example using a locking mechanism, at that particular height.

In some implementations, the headrest can include adjustable projections or wings 160 on one or both sides of the headrest 100. The adjustable wings 10 can be adjusted with respect to the headrest 100 to support an occupants head against lateral movement. For example, the wings 160 may be moved forward angularly with respect to the headrest 100 (e.g., on corresponding axes or hinges 165) to a position that supports an occupant's head against lateral movement. The wings may also be moved backwards angularly with respect to the headrest 100 such that the wings are substantially on the same plane as the rest of the headrest 100.

In some implementations, a headrest 100 can include one or more acoustic transducers or speakers disposed within an enclosure of the headrest. While acoustic output radiated outward directly from the headrest can be used for providing near-field audio for an occupant, this may pose some challenges when the headrest includes adjustable wings. In some cases, the wings 160 may form an obstacle in the acoustic path between the headrest speakers and the occupant's ears. This in turn may diminish the advantages of near-field speakers, and possibly degrade user experience. The amount of degradation may in some cases depend on the positioning of the wings. For example, if an occupant adjusts the headrest wings 160 to a position closer to his/her head, the occupant may notice a difference in the level and/or quality of the audio produced from the headrest speakers. The technology described in this document allows for acoustic outputs to be provided through the wings (as opposed to, for example, around the wings), which in turn may mitigate some of the issues encountered in using headrest speakers in conjunction with adjustable wings. For example, because the headrest wings are conveniently located proximate to the ears of an occupant, acoustic output through the wings may be used to provide an immersive acoustic experience for the occupant. In addition, because acoustic output radiated outwards from the wings of a seat headrest caters primarily to the occupant of that particular seat, such acoustic output may also be personalized for the occupant. Also, in some implementations, the near-field audio radiated through the wings may be mixed with the audio emanating from peripheral speakers disposed elsewhere in a vehicle to produce well-controlled high quality audio.

Audio signals generated by the one or more acoustic transducers in a headrest can be configured to radiate outward through a headrest wing in various ways. In some implementations, the one or more acoustic transducers can be disposed, at least in part within a headrest wing. In some implementations, the one or more acoustic transducers are disposed within an enclosure of the headrest, and the audio signals from the transducers are guided through the headrest wing via an acoustic channel disposed between the enclosure and the headrest wing. Some implementations may also use a combination of the above. For example, if a headrest includes multiple acoustic transducers, some of the transducers (e.g., small tweeters) may be disposed within the wing, while other transducers are disposed within an enclosure within the headrest, with an acoustic channel guiding the output of the latter transducers through the wing.

Figure 2B:
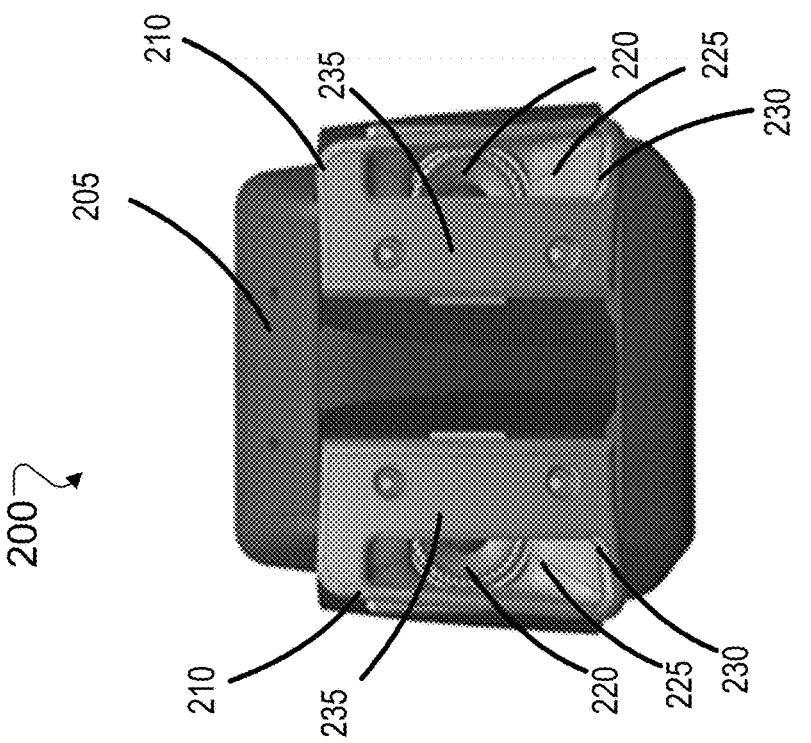
FIGS. 2A and 2B show a top cross-sectional view, and a front view, respectively, of an example of a headrest that includes speakers disposed within the adjustable wings.
Figure 2A:
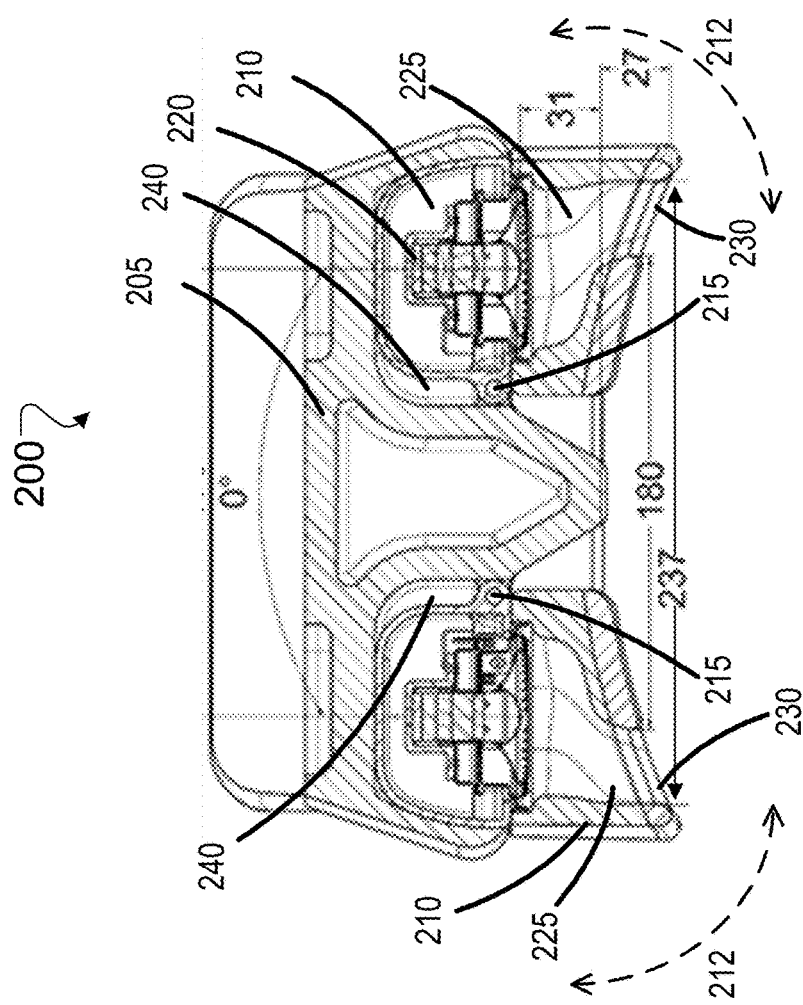

FIGS. 2A and 2B show a top cross-sectional view, and a front view, respectively, of an example of a headrest 200 that includes speakers disposed within the adjustable wings. The headrest 200 includes a housing 205 that provides structural support to the headrest, and two adjustable wings 210. Each of the wings 210 are adjustable to one of multiple positions. For example, each of the wings can be rotated over an angle range 212 with respect to a corresponding axis or pivot 215. The axis or pivot 215 can be stationary with respect to the housing 205 such that the wings 210 can be moved to one of various positions with respect to the housing 205 of the headrest. Although FIG. 2A shows a dedicated pivot 215 for each of the wings, other mechanisms of moving the wings with respect to the acoustic enclosure (e.g., a hinge, a living hinge, or a flexible material the wings) may also be used. In some implementations, the angle range can be less than about 45°. For example, some headrests 200 can be designed such that the wings 210 can be rotated to a position between 0 and 30° angle range. The wings 210 can be manually adjustable, for example, by an occupant's hands, or adjustable by an electronic control signal.

In some implementations, each of the wings 210 includes one or more acoustic transducer 220. Even though FIGS. 2A and 2B show only one acoustic transducer 220 per wing 210, a higher number of acoustic transducers may be disposed in a wing 210. For example, a wing 210 can include an array of acoustic transducers, such as a high frequency driver and a low frequency driver. In some implementations, the one or more acoustic transducers 220 in one of the wings may be different from the one or more acoustic transducers 220 in the other wing. For example, one of the wings may include a high frequency driver (e.g., a tweeter), while the other wing may include a low frequency or mid-range driver. In some implementations, other acoustic elements such as one or more of: an amplifier, a processor, a digital signal processor (DSP), a sensor etc. may also be disposed in one of the wings 210 or the housing 205.

The wing 210 may also include an acoustic channel 225 between the acoustic transducer 220 and an external opening 230 through which audio signals are radiated outwards from the wing 210. The acoustic channel 225 can include a directional acoustic device such as one configured to direct audio signals from the one or more acoustic transducers to the external opening 230. As shown in FIG. 2B, the external opening 230 can be provided on a surface 235 that is configured to support at least a portion of the head of an occupant. In some implementations, the external opening 230 can be covered by a perforated external layer (not shown) configured to pass acoustic signals generated by the one or more transducers. In some implementations, the perforated external layer may also cover at least a portion of the surface 235. The perforated external layer can include, for example, a fabric, or a speaker grill disposed over the external opening 230.

In some implementations, the wing 210 can be constructed of a rigid but lightweight material such as expanded (or injection-molded) resin. Other lightweight rigid material that may be used for constructing the wing include, for example, thermoplastic material such as polystyrene, polypropylene, polyethylene, and acrylonitrile butadiene styrene (ABS). In some implementations, rigid, closed-cell resin foam such as expanded polystyrene (EPS) may be used in constructing at least a portion (e.g., the acoustic channel 225) of the wing 210. In some implementations EPS may provide acoustic isolation from one or more acoustic transducers in the same wing or another wing. In some implementations, a combination of holes and open cell foam may be used in constructing at least a portion of the wing 210. In some implementations, the wing 210 may be constructed from an acoustically translucent material. In such cases, a diffuse radiation pattern may be realized, potentially at the cost of some amount of loss in the acoustic energy radiated outwards through the wing 210.

In some implementations, placing one or more acoustic transducers in a headrest wing 210 may result in a significant sized wing 210. Attaching such large wings 210 adjacent to a headrest (e.g., in front, or on the sides) may in some cases result in a large headrest, which may be considered unacceptable aesthetically and/or functionally. This may be mitigated, in some cases, by providing a recessed headrest housing 205 that accommodates a portion of the wing 210.

This is illustrated in the example of FIG. 2A, where at least a portion of the adjustable headrest wing 210 is disposed within a corresponding recessed portion 240 in the headrest housing 205. As shown in FIG. 2A, the recessed portion 240 allows a portion of the adjustable wing 210 to occupy volume that would otherwise be occupied by the headrest housing 205. This in turn allows for a smaller overall size of the headrest 200 (as compared to, for example, attaching a wing 210 to a side of the headrest housing 205), thereby potentially increasing the aesthetic and functional appeal of the headrest 200. For illustrative purposes, FIG. 2A shows some example dimensions (in mm) associated with the headrest 200.

In some implementations, disposing the wings 210, at least in part, within the recessed portion 240 allows for the wings 210 to be positioned close to one another, thereby permitting the wings to support the head of a seat occupant. In some implementations, the pivots 215 for the two wings may be disposed within the recessed portion 240. The two pivots may be positioned such that both pivots are located substantially behind the head of an occupant of the seat. Such positioning of the pivots may permit, in some cases, the wings to effectively support the head of the occupant while also providing a high quality acoustic experience in accordance with the technology described herein.

In some implementations, the housing 205 can be made lightweight, for example, by constructing at least a portion of the housing 205 from rigid but lightweight material such as expanded (or injection-molded) resin. Other lightweight rigid materials that may be used for constructing the housing 205 include, for example, thermoplastic material such as polystyrene, polypropylene, polyethylene, and acrylonitrile butadiene styrene (ABS). In some implementations, rigid, closed-cell resin foam such as expanded polystyrene (EPS) may be used in constructing at least a portion of the housing 205.

Figure 3A:
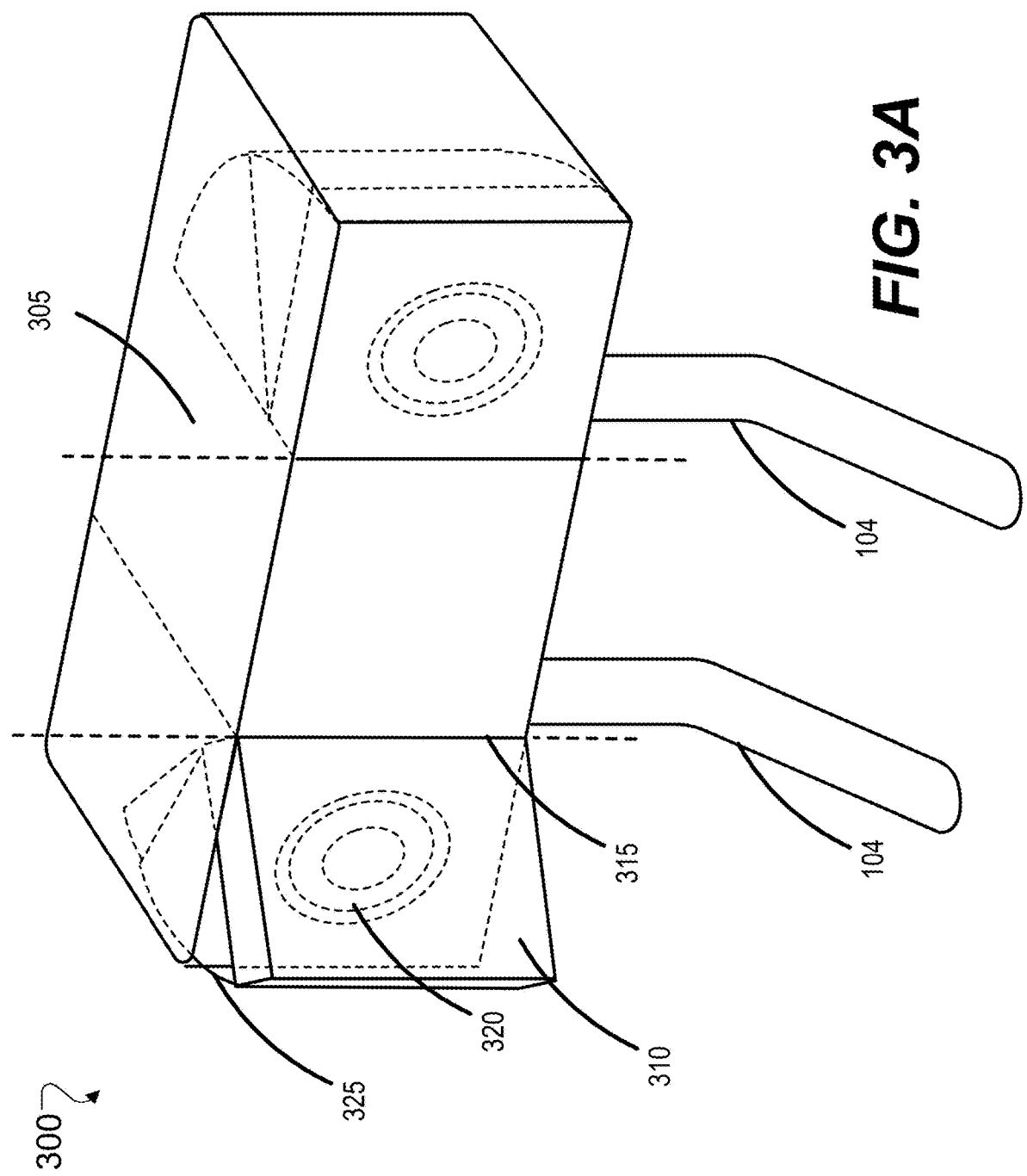
FIG. 3A shows a perspective view of an example of a headrest that includes adjustable wings and speakers disposed within the enclosure of the headrest.

In some implementations, the one or more acoustic transducers can also be placed within the housing of the headrest. In such cases, in order to cause the acoustic output to radiate outwards through a wing, a structure that forms as acoustic channel between the housing and the wing may be provided. An example of such an implementation is provided in FIG. 3A, which shows a perspective view of an example of a headrest 300 that includes adjustable wings 310, and speakers 320 disposed within the enclosure or housing 305 of the headrest. The adjustable wings 310 are adjustable to one of multiple positions within an angle range around an axis or pivot 315. The angle range can be less than about 45° (e.g., a range of about 30° within a span of 0-45°).

The headrest 300 also includes a connector 325 disposed between the enclosure 305 and the headrest wing 310. The connector 325 can be configured to provide an acoustic channel between the enclosure 305 and the headrest wing 310 such that audio signals from the one or more acoustic transducers 320 are radiated outward through the headrest wing 310. In some implementations, the connector 325 may be constructed of a material that is substantially opaque, acoustically, such that a large portion of the acoustic energy emanating from the one or more transducers 320 is radiated outwards through the headrest wing 310. One example of such a material is a three-dimensional knitted fabric, which is discussed in U.S. application Ser. No. 14/453,905, filed on Aug. 7, 2014, the content of which is incorporated herein by reference. Examples of other materials that may be used in constructing the connector include various plastics such as ABS, polypropylene etc., and softer materials such as rubber or liquid silicone rubber (LSR), etc. In some implementations, the connector 325 may be attached to a portion of the front surface of the enclosure 305, and to a rear surface of the wing 310 in a sealing configuration. The headrest wing 310 may also include an acoustic channel such that the audio signals from the connector 325 passes through the wing 310 via such an acoustic channel, and is radiated outwards from a front surface of the wing 310.

Figure 3B:
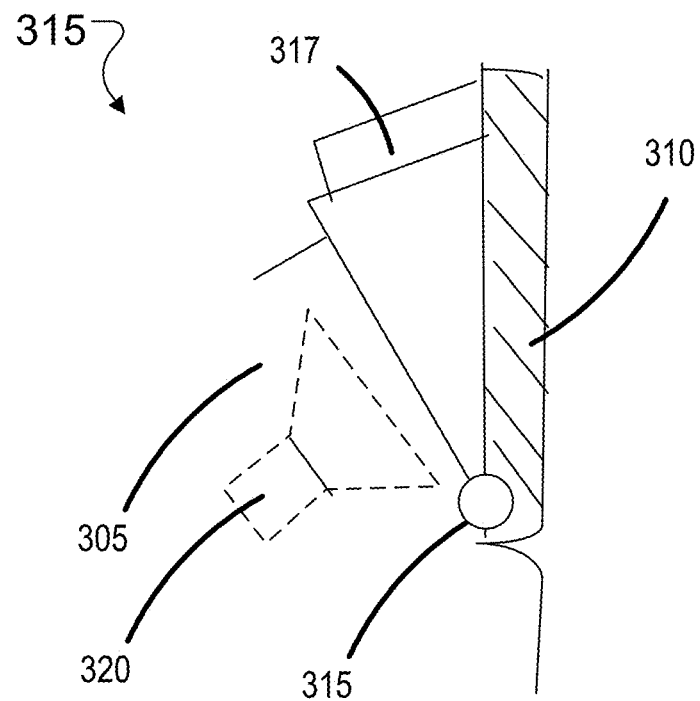
FIGS. 3B and 3C show top views of an example collapsible connector between a headrest enclosure and a rear portion of a headrest wing of the headrest shown in FIG. 3.
Figure 3C:
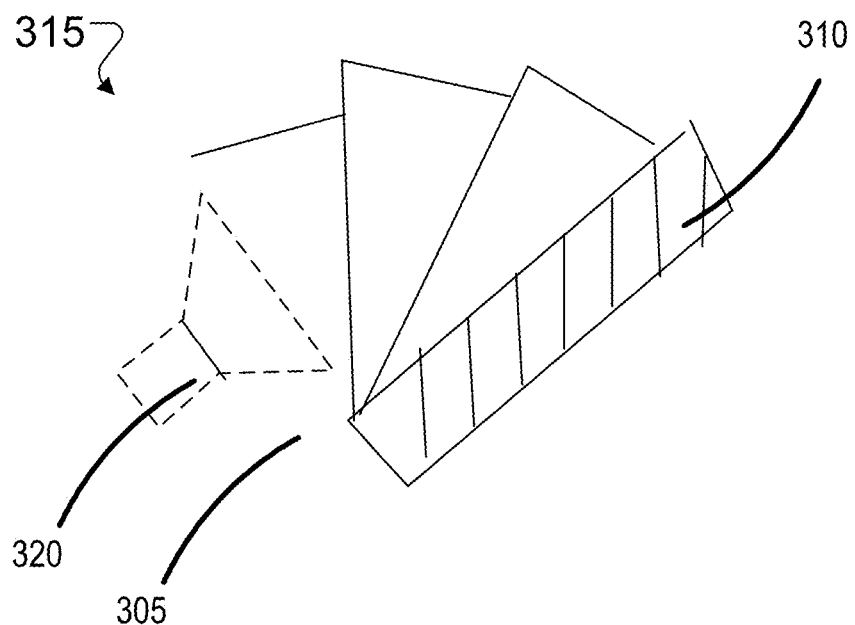

In some implementations, the connector 325 includes a collapsible structure that expands and contracts as the wing 310 is moved away from and closer to, respectively, the enclosure 305. An example of such a collapsible connector 325 is shown in FIGS. 3B and 3C. Specifically, FIG. 3B shows the configuration of the collapsible connector 325 when the wing 310 is pushed close to the enclosure 305. FIG. 3C shows the configuration of the collapsible connector 325 when the wing 310 is moved away from the enclosure 305. In some implementations, the collapsible connector 325 can include one or more telescopic segments 317 that are configured to collapse into one another as the connector 325 is reduced in size. For example, the telescopic segments 317 may be connected to one another at the pivot point 315 such that when the wing 310 is pushed back towards the enclosure 305, the segments 317 rotate and collapse into one another. Conversely, when the wing 310 is pulled away from the enclosure 305, the telescopic segments 317 rotate out of one another and form an acoustic channel between the one or more acoustic transducers 320 and the wing 310.

When audio is radiated through an adjustable headrest wing, the position of the headrest wing may affect the acoustic experience of the user. For example, if a headrest wing is adjusted to a position away from the headrest housing or enclosure (and towards the head of an occupant of the seat), the source of the audio moves closer to the occupant's ears. In some cases, the occupant may find the sound to be uncomfortable (e.g., louder than the sound level prior to adjusting the headrest wing), thereby necessitating manual adjustment of the sound. In some implementations, the need for such manual adjustments may be obviated by automatically adjusting the acoustic output through the wings based on a detected position of the wings. In some cases, gain levels and/or other signal processing parameters associated with the acoustic outputs can be automatically adjusted based on a position of the wings to provide an occupant with a substantially uniform acoustic experience for different positions of the wings.

Figure 4:
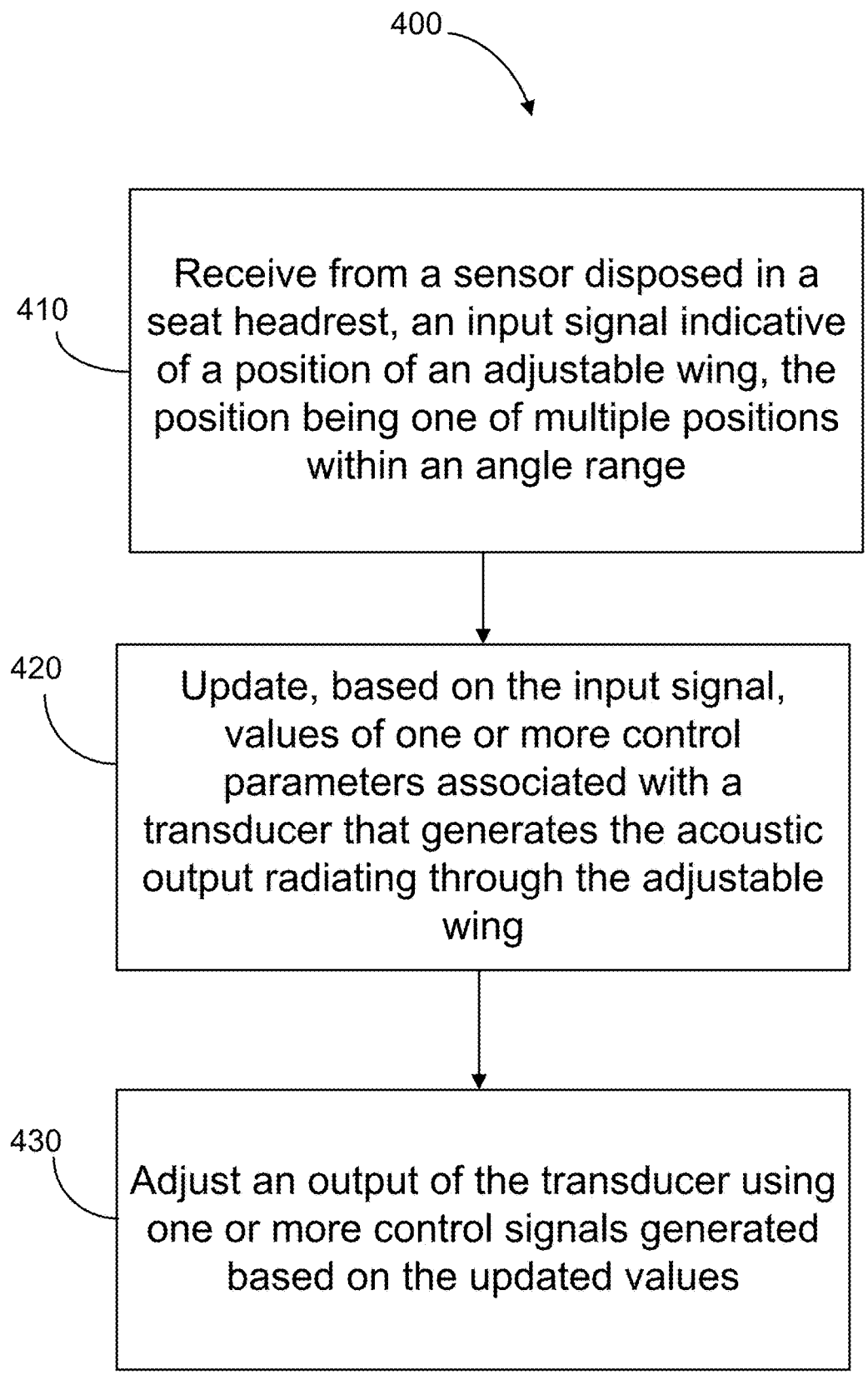
FIG. 4 is a flowchart of an example process for controlling acoustic output radiating through an adjustable wing of a seat headrest.

FIG. 4 is a flowchart of an example process 400 for controlling acoustic output radiating through an adjustable wing of a seat headrest based on a position of the adjustable wing. At least a portion of the operations of the process 400 can be performed by one or more processors disposed in communication with an acoustic system of a vehicle seat. Operations of the process 400 includes receiving an input signal indicative of a position of the adjustable wing (410). The adjustable wing can be substantially similar to those disposed in the headrests 200 or 300 described above. In some implementations, the input signal can be received from a sensor disposed in the seat headrest (e.g., the headrest 200 or 300). Such a sensor can be configured to detect, for example, one of multiple positions within an angle range associated with a current configuration of the headrest wing, and generate the input signal for the one or more processors.

Operations of the process 400 also includes updating, based on the input signal, values for one or more control parameters associated with a transducer that generates the acoustic output radiating through the adjustable wing (420). In some implementations, the control parameters include a gain associated with the acoustic output. For example, the gain of the acoustic output may be reduced as the headrest wing is moved closer to the ears of an occupant. The gain may be controlled as a function of the angle of the headrest wing (e.g., a linear, quadratic, or higher order function), which may be determined, for example, based on pre-compiled information about delivering a uniform acoustic experience over the range of motion of the headrest wing.

In some implementations, the control parameters can include one or more equalization parameters associated with the acoustic output for the particular position of the headrest wing. For example, such equalization parameters may depend on a spectral response of an acoustic channel formed between the source of the acoustic signal and an ear of the occupant for the particular position of the adjustable wing. If the source transducer is disposed in the enclosure of the headrest, the acoustic channel can include the acoustic connector (e.g., the acoustic connector 325) disposed between the transducer and the adjustable wing of the headrest.

In some implementations, the control parameters may account for changes in the spectral characteristics of the acoustic channel. The spectral characteristics can change due to various reasons. In some implementations, when the wings are positioned forward (e.g., closer or more near-field to the occupant's head), the energy in the acoustic channel increases. If the acoustic channel includes the connector 325, the resonance associated with the length of the connector 325 changes with the different positions of the wing. The control parameters (e.g., gain and/or equalization parameters) can be adjusted to account for such changes in the spectral characteristics such that the acoustic experience remains substantially uniform for the different positions of the wings.

The control parameters can be determined in various ways. In some implementations, the control parameters are determined in accordance with a target acoustic distribution (e.g., a volume zone, a particular sound profile etc.) corresponding to the particular seat or occupant. The control parameters can be determined empirically or experimentally for the various wings positions. For example, the change in loudness levels at an occupant's ear for various positions of the headrest wings can be measured (qualitatively or quantitatively) in an experimental setup, and one or more control parameters can be adjusted to obtain the same loudness level for various wing positions. Such experimentally determined parameter values can be electronically stored (e.g., as a look-up table) on a storage device. In such cases, updating the values for the one or more control parameters can include accessing such a table of pre-stored values, and retrieving the values of the one or more control parameters for the position of the wing as indicated by the input signal. In some implementations, the values of the one or more control parameters can be determined in accordance with a target acoustic distribution. Such a target acoustic distribution may be represented, for example, as a ratio of energy of the acoustic output radiating through the wing, and energy of acoustic output radiating from one or more peripheral speakers.

Operations of the process further includes adjusting the transducer using one or more control signals generated based on the updated values (430). The control signals can be generated by the one or more processors and sent to the transducer, possibly via an amplifier. In some implementations, this results in the output of the transducer being automatically adjusted, in real-time or near real-time, when an occupant of a seat adjusts the headrest wings. Such automatic adjustment may obviate or at least reduce the need for any manual adjustment due to the changed position of the headrest wings.

Figure 5:
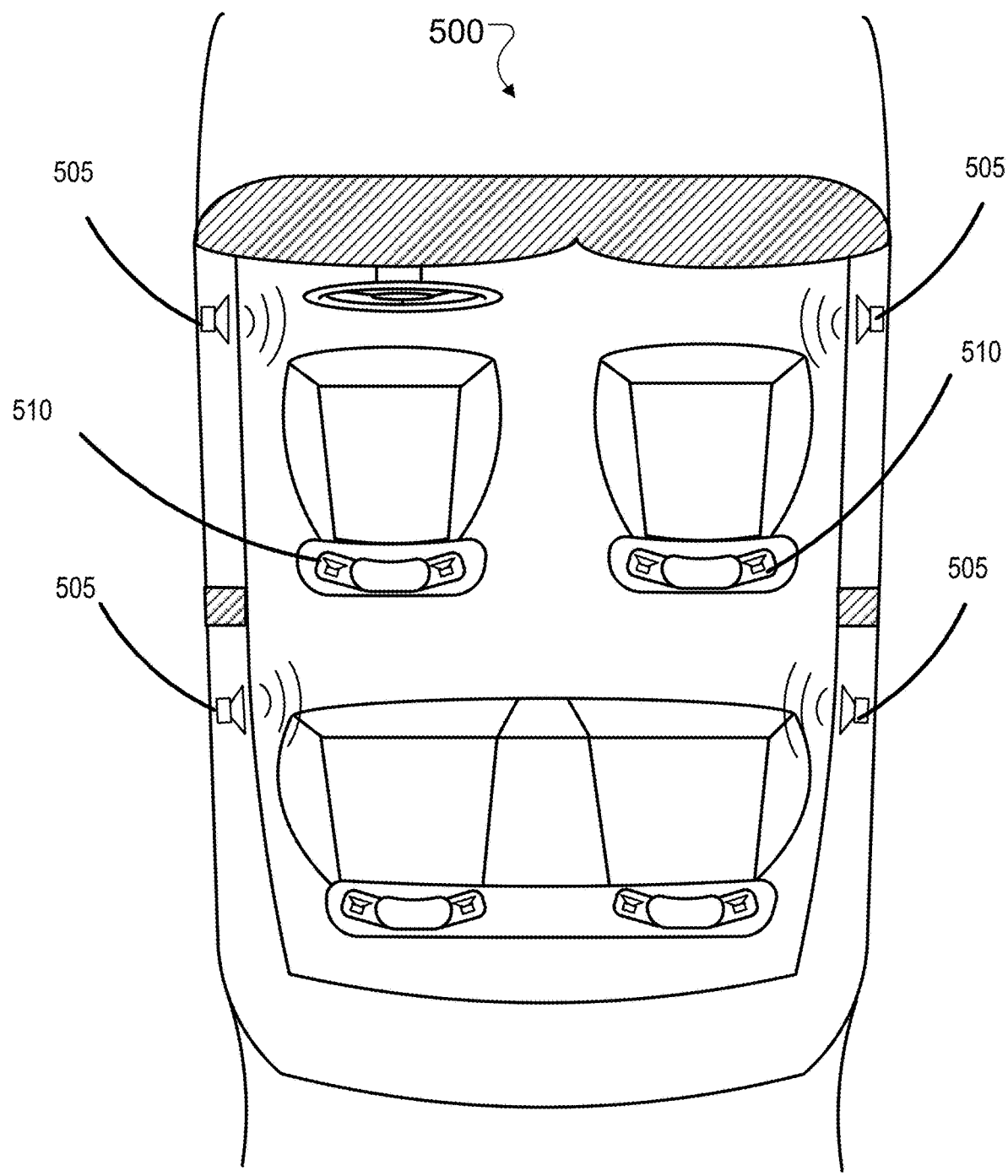
FIG. 5 shows a top view of an interior of a vehicle.

The acoustic headrests described above can be used for providing near-field audio for occupants of the seats in which such headrests are disposed. Such near-field audio can be personalized, processed, or otherwise enhanced to provide high quality acoustic experience to the occupants. In some implementations, the near-field acoustic output through the wings can be adjusted/mixed in accordance with acoustic outputs radiated from peripheral speakers disposed in other parts of the vehicle to produce the high quality acoustic experience. This is illustrated with reference to FIG. 5, which shows a top view of an interior of a vehicle 500 that includes the acoustic headrests described above.

The vehicle 500 includes one or more peripheral speakers 505 disposed around the vehicle 500. The particular example shows the peripheral speakers or transducers to be disposed in the doors. However, the peripheral speakers may be disposed in other portions of the vehicle such as in the dashboard, below the seats, on the ceiling, or other places. In some implementations, any speaker that is not disposed in a headrest wing may be considered as a peripheral speaker 505. The vehicle 500 also includes acoustic headrests 510 that radiate acoustic output through headrest wings. In some implementations, the acoustic outputs from the acoustic headrests 510 can be balanced/mixed with respect to the acoustic outputs from the peripheral speakers to provide target acoustic experiences for the occupants of the vehicle.

The outputs from the acoustic headrests 510 may be balanced with respect to the outputs of the peripheral speakers in various ways. In some implementations, the balancing/mixing can be configured to provide personalized sound zones via a combination of the peripheral speakers 505 and the acoustic headrests 510. For example, the acoustic headrests 510 can be configured to output personalized (e.g., user-defined or user-selectable) sound profiled, whereas the peripheral speakers 505 produce common sound that is heard by all occupants. In such cases, the acoustic headrests 510 can be configured to implement personalized gain control and/or equalization. In another example, the acoustic headrests 510 can be configured to enhance dialog or speech by boosting dialog components of the audio signal, whereas surround sound components are provided through the peripheral speakers 505. Conversely, in some cases, the surround sounds may be provide through the acoustic headrests 510, whereas the peripheral speakers provide the speech/dialog components (e.g., the center channel in 5.1 surround sound). The above examples illustrate some specific ways of using outputs from various near-field and peripheral speakers to enhance acoustic experience, and distributing audio content (e.g., voice, surround sound, etc.) between such near-field and peripheral speakers. Other ways of combining the outputs of near-field and peripheral speakers (which may be specific to particular applications and/or environments) exist, and may be implemented using the technology described herein.

In some implementations, the output of the acoustic headrests 510 can be balanced with respect to the peripheral speakers via the one or more control parameters described above with reference to FIG. 4. For example, the one or more control parameters can be adjusted based on a relative transfer function associated with the corresponding acoustic headrests, as compared to the peripheral speakers 505, or the rest of the acoustic environment (the interior of the vehicle 500, in this example). In some implementations, if the acoustic headrest 510 compliments the peripheral speakers 505, the relative transfer function representing the balance between the acoustic headrest 510 and the peripheral speakers 505 may need to be adjusted (e.g., in one or both of magnitude and phase) as the wings of the acoustic headrest 510 are changed. In such cases, the one or more control parameters can be updated such that the output of an acoustic headrest 510 is adjusted to properly align with the peripheral speakers 505, given a reconfiguration of wing position.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method, comprising:
    receiving, from a sensor, an input signal indicating a configuration of an acoustic channel that is a part of an adjustable wing of a headrest, the wing being adjustable to multiple positions within an angle range;
    adjusting, based on the input signal, one or more control parameters of a transducer in accordance with the configuration of the acoustic channel;
    generating a transducer control signal based on the one or more control parameters; and
    providing the transducer control signal to the transducer to produce an acoustic output that radiates through the acoustic channel.

2. The method of claim 1, wherein the one or more control parameters comprise a gain.

3. The method of claim 1, wherein the one or more control parameters comprise an equalization parameter that depends on an acoustic response of the acoustic channel.

4. The method of claim 1, wherein the one or more control parameters are determined in accordance with a target acoustic distribution in the acoustic channel.

5. The method of claim 1, wherein the adjustable wing is pivotably coupled with the headrest.

6. The method of claim 1, wherein the acoustic channel comprises an acoustic connector arranged between the transducer and the adjustable wing.

7. The method of claim 6, wherein the connector is configured to vary in length in accordance with adjustments to the adjustable wing.

8. The method of claim 6, wherein the connector comprises a collapsible structure.

9. A system, comprising:
    a sensor configured to produce an input signal, wherein the input signal indicates a configuration of an acoustic channel that is a part of an adjustable wing of a headrest, the wing being adjustable to multiple positions within an angle range; and
    one or more processing devices configured to:
        receive the input signal;
        adjust, based on the input signal, one or more control parameters of a transducer in accordance with the configuration of the acoustic channel;
        generate a transducer control signal based on the one or more control parameters; and
        provide the transducer control signal to the transducer to produce an acoustic output that radiates through the acoustic channel.

10. The system of claim 9, wherein the one or more control parameters comprise a gain.

11. The system of claim 9, wherein the one or more control parameters comprise and equalization parameter that depends on an acoustic response of the acoustic channel.

12. The system of claim 9, wherein the one or more control parameters are determined in accordance with a target acoustic distribution in the acoustic channel.

13. The system of claim 9, wherein the adjustable wing is pivotably coupled with the headrest.

14. The system of claim 9, wherein the acoustic channel comprises an acoustic connector arranged between the transducer and the adjustable wing.

15. The system of claim 14, wherein the connector comprises a collapsible structure.

16. One or more machine-readable storage devices having encoded thereon computer readable instructions for causing one or more processing devices to perform operations comprising:
    receiving, from a sensor, an input signal indicating a configuration of an acoustic channel being part of an adjustable wing of a headrest, the wing being adjustable to multiple positions within an angle range;
    adjusting, based on the input signal, one or more control parameters of a transducer in accordance with the configuration of the acoustic channel;
    generating a transducer control signal based on the one or more control parameters; and
    providing the transducer control signal to the transducer to produce an acoustic output that radiates through the acoustic channel.

17. The one or more machine-readable storage devices of claim 16, wherein the one or more control parameters comprise a gain.

18. The one or more machine-readable storage devices of claim 16, wherein the one or more control parameters comprise an equalization parameter that depends on an acoustic response of the acoustic channel.

19. The one or more machine-readable storage devices of claim 16, wherein the one or more control parameters are determined in accordance with a target acoustic distribution in the acoustic channel.

20. The one or more machine-readable storage devices of claim 16, wherein the adjustable wing is pivotably coupled with the headrest.

\* \* \* \* \*